United States Patent
Liang et al.

(10) Patent No.: US 11,616,840 B2
(45) Date of Patent: Mar. 28, 2023

(54) METHOD, APPARATUS AND SYSTEM FOR PROCESSING UNMANNED VEHICLE DATA, AND STORAGE MEDIUM

(71) Applicant: BEIJING BAIDU NETCOM SCIENCE TECHNOLOGY CO., LTD., Beijing (CN)

(72) Inventors: Jiaqi Liang, Beijing (CN); Gao Yu, Beijing (CN); Gaifan Li, Beijing (CN)

(73) Assignee: APOLLO INTELLIGENT DRIVING TECHNOLOGY (BEIJING) CO., LTD., Beijing (CN)

(*) Notice: Subject to any disclaimer, the term of this patent is extended or adjusted under 35 U.S.C. 154(b) by 126 days.

(21) Appl. No.: 16/718,040

(22) Filed: Dec. 17, 2019

(65) Prior Publication Data
US 2020/0195725 A1     Jun. 18, 2020

(30) Foreign Application Priority Data

Dec. 17, 2018    (CN) .......................... 201811543223.7

(51) Int. Cl.
| H04L 67/1097 | (2022.01) |
| H04L 67/12 | (2022.01) |
| H04L 47/12 | (2022.01) |
| H04W 4/44 | (2018.01) |

(52) U.S. Cl.
CPC .............. *H04L 67/12* (2013.01); *H04L 47/12* (2013.01); *H04L 67/1097* (2013.01); *H04W 4/44* (2018.02)

(58) Field of Classification Search
CPC ..... H04L 67/12; H04L 47/12; H04L 67/1097; H04L 67/10; H04W 4/44
See application file for complete search history.

(56) References Cited

U.S. PATENT DOCUMENTS

| 9,646,428 | B1* | 5/2017 | Konrardy ............. G07C 5/0816 |
| 11,242,051 | B1* | 2/2022 | Konrardy ......... G08G 1/096791 |
| 2010/0030473 | A1* | 2/2010 | Au ......................... G06V 20/56 |
| | | | 701/28 |
| 2016/0205219 | A1 | 7/2016 | Shijiang |

(Continued)

FOREIGN PATENT DOCUMENTS

| CN | 103957244 A | 7/2014 |
| CN | 105976450 A | 9/2016 |

(Continued)

OTHER PUBLICATIONS

First Office Action of the prior Chinese application.
The Notice of allowed of CN application No. 2018115432237.

*Primary Examiner* — Eyob Hagos
(74) *Attorney, Agent, or Firm* — J.C. Patents

(57) ABSTRACT

The present disclosure provides a method, an apparatus and a system for processing unmanned vehicle data, and a storage medium, where the method includes: receiving data acquisition indication information sent by a cloud server; obtaining, according to the data acquisition indication information, target data from a data set; and storing the target data, and/or sending the target data to the cloud server, which can thereby achieve acquisition and storage of data meets a preset condition, reduce amount of data storage of the unmanned vehicle and amount of data sent to the cloud server, save network resources, and improve data transmission efficiency.

6 Claims, 5 Drawing Sheets

(56) References Cited

U.S. PATENT DOCUMENTS

| | | | |
|---|---|---|---|
| 2017/0008521 A1* | 1/2017 | Braunstein | G01C 21/32 |
| 2017/0132712 A1 | 5/2017 | Bowne | |
| 2018/0101172 A1* | 4/2018 | Min | G05D 1/0287 |
| 2019/0155291 A1* | 5/2019 | Heit | B60W 30/00 |
| 2020/0241532 A1* | 7/2020 | Suzuki | B60N 2/002 |
| 2021/0380138 A1* | 12/2021 | Kucharski | H04W 4/023 |
| 2021/0398045 A1* | 12/2021 | Hanebeck | G06Q 10/06315 |

FOREIGN PATENT DOCUMENTS

| | | | |
|---|---|---|---|
| CN | 106297283 A | | 1/2017 |
| CN | 106444662 A | | 2/2017 |
| CN | 106856502 A | * | 6/2017 |
| CN | 107423336 A | | 12/2017 |
| CN | 107508858 A | | 12/2017 |
| CN | 108124252 A | | 6/2018 |
| CN | 108282739 A | | 7/2018 |
| CN | 108804668 A | | 11/2018 |
| CN | 108959060 A | | 12/2018 |

* cited by examiner

METHOD, APPARATUS AND SYSTEM FOR PROCESSING UNMANNED VEHICLE DATA, AND STORAGE MEDIUM

CROSS-REFERENCE TO RELATED APPLICATION

This application claims priority to Chinese Patent Application No. 201811543223.7, filed on Dec. 17, 2018, which is hereby incorporated by reference in its entirety.

TECHNICAL FIELD

The present disclosure relates to the field of vehicle technology, and in particular, to a method, an apparatus and a system for unmanned vehicle data processing and a storage medium.

BACKGROUND

With a development of vehicle technology, an unmanned vehicle begin to be applied, however, the unmanned vehicle will acquire a large amount of data during driving, so it is necessary to store and manage the data generated during the driving of the unmanned vehicle.

At present, the unmanned vehicle continuously stores the data generated in real time during the driving, and then sends them to a cloud server; or, after the driving of the unmanned vehicle ends, stores the data during the driving and then sends them to the cloud server together.

However, this kind of data processing method will make the acquired data to occupy a large amount of storage space of the unmanned vehicle, affect data transmission efficiency, and bring about a problem such as network congestion.

SUMMARY

The present disclosure provides a method, an apparatus and a system for processing unmanned vehicle data, and a storage medium, which can achieve acquisition and storage of data meets a preset condition, reduce amount of data storage of the unmanned vehicle and amount of data sent to a cloud server, save network resources and improve data transmission efficiency.

In a first aspect, an embodiment of the present disclosure provides a method for processing unmanned vehicle data, including:

receiving data acquisition indication information sent by a cloud server;

obtaining, according to the data acquisition indication information, target data from a data set; and storing the target data, and/or sending the target data to the cloud server.

In a possible design, the receiving data acquisition indication information sent by a cloud server includes:

receiving the data acquisition indication information sent by the cloud server by using an OTA (over the air) mode; where the data acquisition indication information includes condition information and data information associated with the condition information.

In a possible design, before the receiving data acquisition indication information sent by a cloud server, the method further includes:

storing all data generated during driving of an unmanned vehicle in the data set; where an acquisition time of each piece of the data is recorded in the data set.

In a possible design, the obtaining, according to the data acquisition indication information, target data from a data set includes:

extracting condition information from the data acquisition indication information, where the condition information includes: any one or more of time information, location information, vehicle information, and vehicle use information;

determining a target time period of a data acquisition when a current state of an unmanned vehicle meets the condition information;

taking data that is associated with the condition information and whose data acquisition time is in the target time period as the target data, where the target data includes: any one or more of user number, logistics information, user somatosensory information, brake information, environment information, distance information between an obstacle and the unmanned vehicle; and obtaining the target data from the data set.

In a possible design, the determining a target time period of a data acquisition when a current state of the unmanned vehicle meets the condition information includes:

obtaining time information in the condition information when the current state of the unmanned vehicle meets the condition information;

selecting a time point from the time information; and taking a time period from X seconds before the time point to X seconds after the time point as the target time period of the data acquisition.

In a possible design, the storing the target data, and/or sending the target data to the cloud server includes:

storing the target data in a log file, and/or sending the log file to the cloud server.

In a second aspect, an embodiment of the present disclosure provides an apparatus for processing unmanned vehicle data, including:

a receiving module, configured to receive data acquisition indication information sent by a cloud server;

an obtaining module, configured to obtain, according to the data acquisition indication information, target data from a data set; and a storage module, configured to store the target data, and/or send the target data to the cloud server.

In a possible design, the receiving module is specifically configured to:

receive the data acquisition indication information sent by the cloud server by using an OTA mode; where the data acquisition indication information includes condition information and data information associated with the condition information.

In a possible design, the method further includes:

an acquiring module, configured to store all data generated during driving of an unmanned vehicle in the data set; where an acquisition time of each piece of the data is recorded in the data set.

In a possible design, the obtaining module is specifically to:

extract condition information from the data acquisition indication information, where the condition information includes: any one or more of time information, location information, vehicle information, and vehicle use information;

determine a target time period of a data acquisition when a current state of the unmanned vehicle meets the condition information;

take data that is associated with the condition information and whose data acquisition time is in the target time period as the target data, where the target data includes: any one or more of user number, logistics information, user somatosensory information, brake information, environment information, distance information between an obstacle and the unmanned vehicle; and obtain the target data from the data set.

In a possible design, the determining a target time period of a data acquisition when a current state of the unmanned vehicle meets the condition information includes:

obtaining time information in the condition information when the current state of the unmanned vehicle meets the condition information;

selecting a time point from the time information; and taking a time period from X seconds before the time point to X seconds after the time point as the target time period of the data acquisition.

In a possible design, the storage module is specifically configured to:

store the target data in a log file, and/or send the log file to the cloud server.

In a third aspect, an embodiment of the present disclosure provides a system for processing unmanned vehicle data, including: a memory and a processor, where the memory stores executable instructions for the processor; where the processor is configured to perform the method for processing the unmanned vehicle data according to any one of the first aspect by performing the executable instructions.

In a fourth aspect, an embodiment of the present disclosure provides a computer readable storage medium having a computer program stored thereon, where the program, when executed by a processor, implement the method for processing the unmanned vehicle data according to any one of the first aspect.

In a fifth aspect, an embodiment of the present disclosure provides a program product, where the program product includes: a computer program, where the computer program is stored in a readable storage medium, and at least one processor of a server can read the computer program from the readable storage medium, and the at least one processor executes the computer program to cause the server to perform the method for processing the unmanned vehicle data according to any one of the first aspect.

The present disclosure provides a method, an apparatus and a system for processing unmanned vehicle data, and a storage medium, which, by receiving data acquisition indication information sent by a cloud server; obtaining, according to the data acquisition indication information, target data from a data set; and storing the target data, and/or sending the target data to the cloud server, can thereby achieve acquisition and storage of data meets a preset condition, reduce amount of data storage of the unmanned vehicle and amount of data sent to the cloud server, save network resources, and improve data transmission efficiency.

BRIEF DESCRIPTION OF DRAWINGS

In order to illustrate embodiments of the present disclosure or technical solutions in the prior art more clearly, accompanying drawings used in description of the embodiments or the prior art will be briefly illustrated below. Obviously, the accompanying drawings in the following description are some embodiments of the present disclosure, and other accompanying drawings can be obtained according to the accompanying drawings without any creative work for those skilled in the art.

Figure 1:
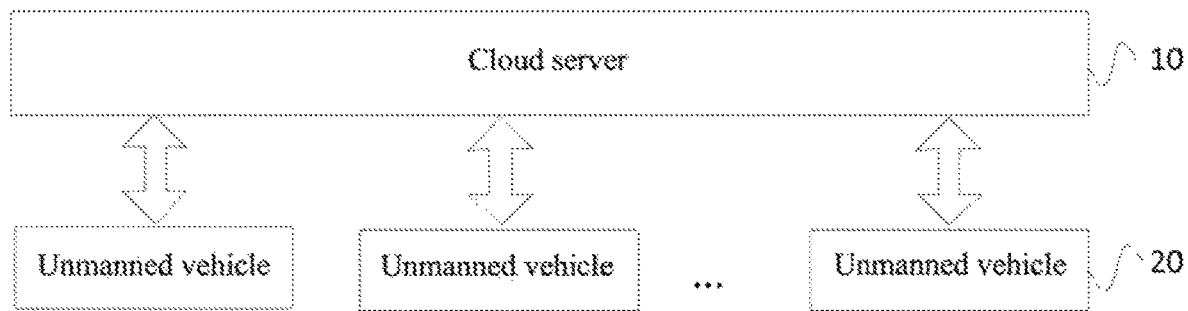
FIG. 1 is a schematic diagram of a principle of an application scenario of the present disclosure.

The explicit embodiments of the present disclosure have been shown by the above-described drawings, which will be described in more detail later. The drawings and the text description are not intended to limit the scope of the present disclosure in any way, but to illustrate the concept of the present disclosure for those skilled in the art by reference to specific embodiments.

DESCRIPTION OF EMBODIMENTS

In order to make the purpose, technical solutions and advantages of the embodiments of the present disclosure clearer, the technical solutions of the embodiments of the present disclosure will be clearly and completely described below with reference to the accompanying drawings in the embodiments of the present disclosure. Apparently, the described embodiments are part of the embodiments of the present disclosure, rather than all of the embodiments. On the basis of the embodiments of the present disclosure, all other embodiments obtained by those of ordinary skilled in the art without any creative work fall within the protection scope of the present disclosure.

The terms "first", "second", "third", and "fourth" and the like (if any) in the specification and claims of the present disclosure and the above drawings are used to distinguish similar objects, and are not necessarily used to describe a particular order or sequence. It should be understood that the data used in this way can be interchanged as appropriate, so that the embodiments of the present disclosure described herein can be implemented, for example, in a sequence other than those illustrated or described herein. In addition, the terms "comprise" and "include" and any variations thereof are intended to cover a non-exclusive inclusion, for example, a process, a method, an system, a product or a device that comprises a series of steps or units is not necessarily limited to those steps or units clearly listed, but can include other steps or units that are not explicitly listed or that are inherent to such a process, a method, a product or a device.

In the following, some of the terms in the present disclosure are explained so as to be understood by those skilled in the art that:

over the air (OTA for short) is a technology for remotely managing data of a card and applications through an air interface of a mobile communication. The air interface can adopt wireless application protocol (WAP), general packet radio service (GPRS), and short message technology. The applications of OTA technology enable the mobile communication to not only provide voice and data services, but also provide a new business download.

Technical solutions of the present disclosure will be described in detail below with specific embodiments. The following specific embodiments can be combined with each other, and same or similar concepts or processes may not be described again in some embodiments.

An unmanned driving vehicle is also known as an unmanned vehicle. The unmanned driving vehicle is a product of a latest technological achievement such as an electronic computer combined with a modern vehicle industry. It usually has functions of automatic driving, automatic speed changing, and automatic road recognition. There are a large number of data acquisition apparatuses on the unmanned vehicle, such as a video image acquisition apparatus, a radar ranging apparatus, a positioning apparatus, and a somatosensory apparatus. During driving of the unmanned vehicle, these data acquisition apparatuses will acquire a large amount of data in real time, store them continuously, and then send then to a cloud server; or, after the driving of the unmanned vehicle ends, store the data during the driving and then send them to the cloud server together.

However, this kind of data processing method will make the acquired data to occupy a large amount of storage space of the unmanned vehicle, affect data transmission efficiency, and bring about a problem such as network congestion. At the same time, a lot of data is data with low analysis value. For example, when the unmanned vehicle is in a normal driving state, data acquired by the data acquisition apparatuses is basically the same and there is no particularity, thus the analysis value is low.

In view of the above technical problem, the present disclosure provides a method, which can set condition information, and can achieve acquisition and storage of data meets a preset condition, reduce amount of data storage of the unmanned vehicle and amount of data sent to a cloud server, save network resources and improve data transmission efficiency. At the same time, an analysis value of these data is higher and more targeted.

FIG. 1 is a schematic diagram of a principle of an application scenario of the present disclosure. As shown in FIG. 1, a cloud server 10 can send data acquisition indication information to an unmanned vehicle 20 by using an OTA mode and the like. The data acquisition indication information includes condition information and data information associated with the condition information.

Specifically, time information in the condition information is obtained when a current state of the unmanned vehicle 20 meets the condition information, a time point is selected from the time information; and a time period from X seconds before the time point to X seconds after the time point is taken as a target time period of the data acquisition. Data that is associated with the condition information and whose data acquisition time is in the target time period is taken as target data from a data set.

It should be noted that data generated during driving of the unmanned vehicle 20 (for example, environmental information, user somatosensory information, driving information, or the like) is stored in the data set, and each piece of the data will record a data acquisition time during the acquisition accordingly. The unmanned vehicle can clean up the data in the data set according to a preset rule. For example, data that meets the condition information is stored in a log file, and then the remaining data that does not meet the condition information is periodically cleaned up. In an implementation, the log file can be stored on an unmanned vehicle side, or the log file can also be sent to the cloud server 10.

Specifically, for example, the data acquisition instruction information is "acquiring a distance between an obstacle and the unmanned vehicle when a sudden braking occurs", then time information at the time of the sudden braking is firstly obtained, and then the distance between the obstacle and the unmanned vehicle within a time period from 10 seconds before the time point to 10 seconds after the time point is obtained. Through the distance between the obstacle and the unmanned vehicle, information such as acceleration curve and braking performance of the unmanned vehicle when braking can be analyzed, which is valuable data that unmanned vehicle researchers concerns about. However, data at other times is of lower analysis value compared to this part of the data, and can be processed pertinently, thereby reducing the amount of data storage of the unmanned vehicle and the amount of data sent to the cloud server, and saving the network resources.

It should be noted that the cloud server 10 can simultaneously send data acquisition indication information to multiple unmanned vehicles 20, and can also receive target data sent by multiple unmanned vehicles 20. In an implementation, a communication mode between the cloud server 10 and the unmanned vehicles 20 can also be a wireless transmission mode other than the OTA mode. The implementation principle is similar to the foregoing method, and details are not described herein again.

The above method can be applied to achieve the acquisition and storage of data meets the preset condition, reduce the amount of data storage of the unmanned vehicle and the amount of data sent to the cloud server, save the network resources and improve the data transmission efficiency.

The technical solutions of the present disclosure and how the technical solutions of the present disclosure solve the above technical problems will be described in detail below with reference to the specific embodiments. The following several specific embodiments can be combined with each other, and same or similar concepts or processes may not be described in some embodiments. Embodiments of the present disclosure will be described below with reference to the drawings.

Figure 2:
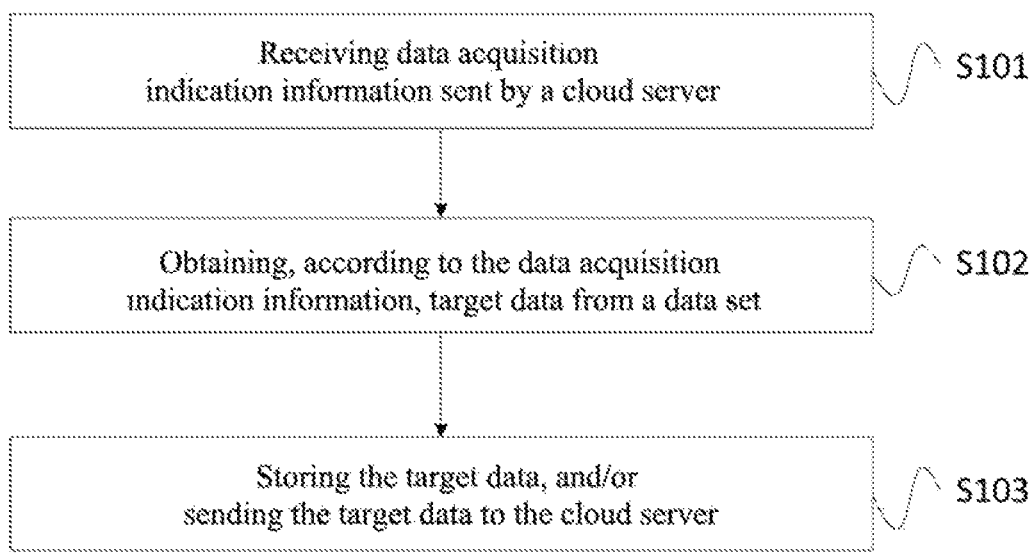
FIG. 2 is a flowchart of a method for processing unmanned car data of Embodiment 1 according to the present disclosure.

FIG. 2 is a flowchart of a method for processing unmanned car data of Embodiment 1 according to the present disclosure. As shown in FIG. 2, the method in this embodiment can include:

S101: Receiving data acquisition indication information sent by a cloud server.

In this embodiment, an unmanned vehicle receives the data acquisition indication information sent by the cloud server by using an OTA mode; and the data acquisition indication information includes condition information and data information associated with the condition information.

Specifically, the OTA mode is a technology for remotely managing data of a card and applications through an air interface of a mobile communication. The air interface can adopt wireless application protocol (WAP), general packet radio service (GPRS), and short message technology. The cloud server can send data acquisition indication information to the target unmanned vehicle by using the OTA mode. The data acquisition indication information includes condition information and data information associated with the condition information.

Specifically, the data acquisition instruction information is "acquiring a distance between an obstacle and the unmanned vehicle when a sudden braking occurs", where "sudden braking" is the condition information that triggers a data acquisition, and "a distance between an obstacle and the unmanned vehicle" is the associated data information, that is, data indicator information that a user cares about.

It should be noted that the cloud server can simultaneously send the data acquisition indication information to multiple unmanned vehicles, and can also receive target data sent by multiple unmanned vehicles.

In an implementation, a communication mode between the cloud server 10 and the unmanned vehicles 20 can also be a wireless transmission mode other than the OTA mode. The implementation principle is similar to the foregoing method, and details are not described herein again.

S102: Obtaining, according to the data acquisition indication information, target data from a data set.

In this embodiment, condition information is extracted from the data acquisition indication information, where the condition information includes: any one or more of time information, location information, vehicle information, and vehicle use information; when a current state of the unmanned vehicle meets the condition information, a target time period of a data acquisition is determined; and data that is associated with the condition information and whose data acquisition time is in the target time period is taken as target data, where the target data includes: any one or more of user number, logistics information, user somatosensory information, brake information, environment information, distance information between an obstacle and the unmanned vehicle; and the target data is obtained from the data set.

Specifically, the time information in the condition information can be information with a determined time period, for example, data is acquired and fed once with a trigger condition of 6 months. The vehicle information can include information such as a vehicle type and a vehicle frame number. For example, data for a vehicle type or a batch of vehicles is acquired. Vehicle use information can be divided into two purposes: passenger and logistics. Vehicles with different uses are interested in different data, so the target data acquired may be different.

Specifically, vehicles for passenger use may be more concerned with user somatosensory data, while vehicles for logistics use may be more concerned with an efficiency of the logistics. When the current state of the unmanned vehicle meets the condition information, the target time period of the data acquisition is determined. The data that is associated with the condition information and whose data acquisition time is in the target time period is taken as the target data from the data set. Among them, the data set stores all the data generated during the driving of the unmanned vehicle, and each piece of the data record includes the acquisition time of the data.

It should be noted that, in this embodiment, contents of the condition information and the target data is not limited, and those skilled in the art can increase or decrease the contents of the condition information and the target data according to actual conditions.

In an implementation, when the current state of the unmanned vehicle meets the condition information, determining the target time period of the data acquisition, including: obtaining time information in the condition information when the current state of the unmanned vehicle meets the condition information; selecting a time point from the time information; and taking a time period from X seconds before the time point to X seconds after the time point as the target time period of the data acquisition.

Specifically, the data acquisition instruction information is "acquiring a distance between an obstacle and the unmanned vehicle when a sudden braking occurs", then time information at the time of the sudden braking is firstly obtained, and then the distance between the obstacle and the unmanned vehicle within a time period from 10 seconds before the time point to 10 seconds after the time point is obtained. Through the distance between the obstacle and the unmanned vehicle, information such as acceleration curve and braking performance of the unmanned vehicle when braking can be analyzed, which is valuable data that unmanned vehicle researchers concerns about. However, data at other times is of lower analysis value compared to this part of the data, and can be processed pertinently, thereby reducing the amount of data storage of the unmanned vehicle and the amount of data sent to the cloud server, and saving the network resources.

S103: Storing the target data, and/or sending the target data to the cloud server.

In this embodiment, the unmanned vehicle stores the target data in a log file, and/or sends the log file to the cloud server.

Specifically, target data corresponding to a piece of data acquisition indication information can be stored into the log file according to the data acquisition indication information, and the file is named according to a preset rule. Finally, the log file is sent to the cloud server by using the OTA mode, so that the user can analyze and interpret this part of data.

This embodiment, by receiving data acquisition indication information sent by a cloud server; obtaining, according to the data acquisition indication information, target data from a data set; and storing the target data, and/or sending the target data to the cloud server, can thereby achieve acquisition and storage of data meets a preset condition, reduce amount of data storage of the unmanned vehicle and amount of data sent to the cloud server, save network resources, and improve data transmission efficiency.

Figure 3:
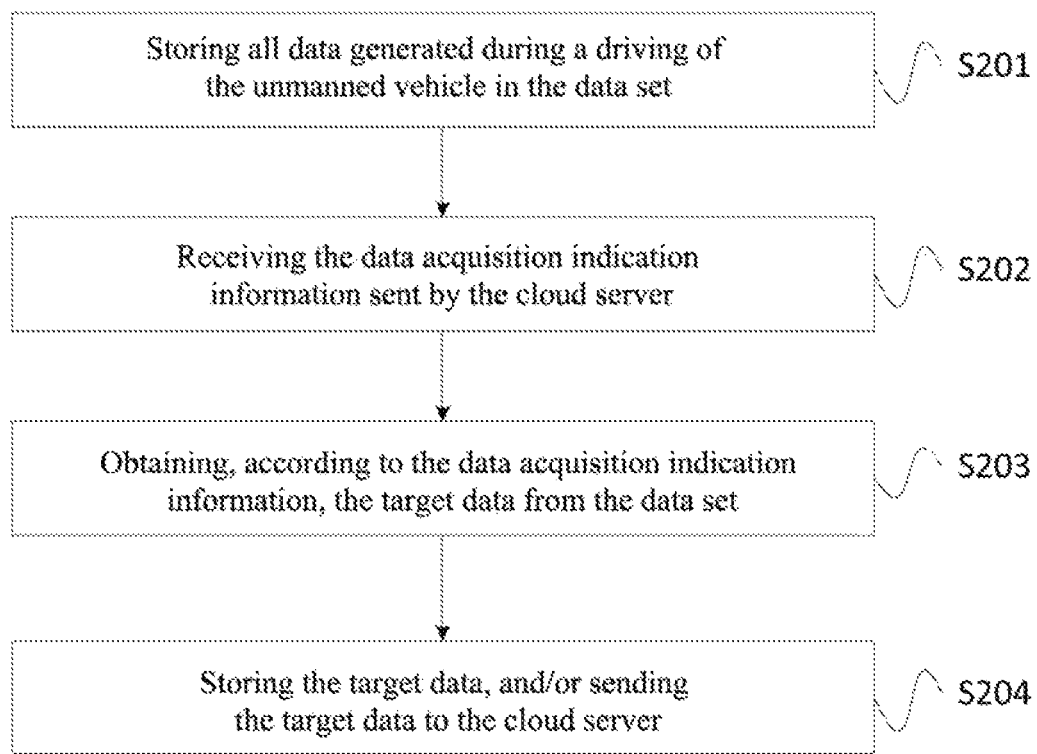
FIG. 3 is a flowchart of a method for processing unmanned car data of Embodiment 2 according to the present disclosure.

FIG. 3 is a flowchart of a method for processing unmanned car data of Embodiment 2 according to the present disclosure. As shown in FIG. 3, the method in this embodiment can include:

S201: storing all data generated during a driving of the unmanned vehicle in the data set.

In this embodiment, a sensor in the unmanned vehicle acquire all the data generated during the driving, each piece of the data records an acquisition time, and these data constitute the data set. In the subsequent steps, it is only necessary to obtain corresponding data from the data set according to the condition, thereby improving a processing speed of the data.

In this embodiment, the data generated during the driving of the unmanned vehicle (for example, environmental information, user somatosensory information, driving information, or the like) is stored in the data set, and each piece of the data will record a data acquisition time during the acquisition accordingly. The unmanned vehicle can clean up the data in the data set according to a preset rule. For example, data that meets the condition information is stored in a log file, and then the remaining data that does not meet the condition information is periodically cleaned up. In an implementation, the log file can be stored on an unmanned vehicle side, or the log file can also be sent to the cloud server 10.

It should be noted that, in this embodiment, the data set is used as a temporary storage space for the data generated during the driving of the unmanned vehicle. All the data generated during the driving of the unmanned vehicle can be stored in the data set, and a data filtering module is also set in the data set for pre-filtering the data generated during the driving process of the unmanned vehicle. Therefore, a utilization of the storage space in the data set can be improved, and an overflow of the storage space of the data set can be reduced.

In an optional implementation, the user can set a frequency of the data set to clean up the space automatically, or the data in the data set is automatically cleaned up when the data stored in the data set exceeds a preset threshold.

In another optional implementation, the unmanned vehicle can generate a data cleaning up reminder on a vehicle terminal interface when the data stored in the data set exceeds the preset threshold. Then, a data cleaning up of the data set is completed according to operation information input by the user on the vehicle terminal interface.

S202: Receiving a data acquisition indication information sent by the cloud server.

S203: Obtaining, according to the data acquisition indication information, the target data from the data set.

S204: Storing the target data, and/or sending the target data to the cloud server.

In this embodiment, for the specific implementation processes and technical principles of the steps S202 to S204, reference is made to the related descriptions in the steps S101 to S103 in the method shown in FIG. 2, and details are not described herein again.

This embodiment, by receiving data acquisition indication information sent by a cloud server; obtaining, according to the data acquisition indication information, target data from a data set; and storing the target data, and/or sending the target data to the cloud server, can thereby achieve acquisition and storage of data meets a preset condition, reduce amount of data storage of the unmanned vehicle and amount of data sent to the cloud server, save network resources, and improve data transmission efficiency.

In addition, this embodiment can also acquire all the data during the driving of the unmanned vehicle in real time and store them in the data set, thereby realizing an all-round monitoring of the unmanned vehicle.

Figure 4:
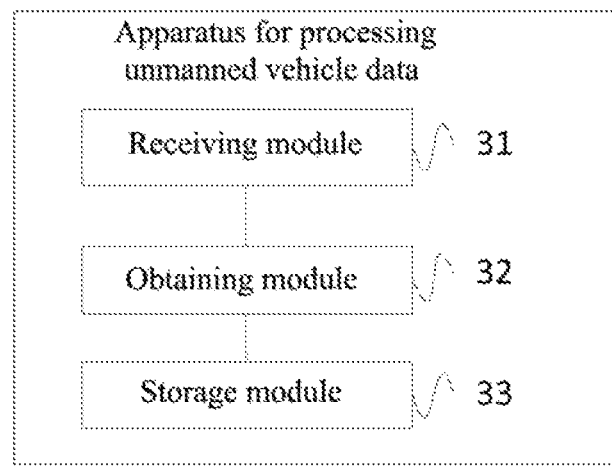
FIG. 4 is a schematic structural diagram of an apparatus for processing unmanned vehicle data according to Embodiment 3 of the present disclosure.

FIG. 4 is a schematic structural diagram of an apparatus for processing unmanned vehicle data according to Embodiment 3 of the present disclosure. As shown in FIG. 4, the apparatus for the processing unmanned vehicle data of this embodiment may include:

a receiving module 31, configured to receive data acquisition indication information sent by a cloud server;

an obtaining module 32, configured to obtain, according to the data acquisition indication information, target data from a data set; and a storage module 33, configured to store the target data, and/or send the target data to the cloud server.

In a possible design, the receiving module 31 is specifically configured to:

receive the data acquisition indication information sent by the cloud server by using an OTA mode; where the data acquisition indication information includes condition information and data information associated with the condition information.

In one possible design, the obtaining module 32 is specifically configured to:

extract condition information from the data acquisition indication information, where the condition information includes: any one or more of time information, location information, vehicle information, and vehicle use information;

determine a target time period of a data acquisition when a current state of the unmanned vehicle meets the condition information;

take data that is associated with the condition information and whose data acquisition time is in the target time period as the target data, where the target data includes: any one or more of user number, logistics information, user somatosensory information, brake information, environment information, distance information between an obstacle and the unmanned vehicle; and obtain the target data from the data set.

In a possible design, the determining a target time period of a data acquisition when a current state of the unmanned vehicle meets the condition information includes:

obtaining time information in the condition information when the current state of the unmanned vehicle meets the condition information;

selecting a time point from the time information; and taking a time period from X seconds before the time point to X seconds after the time point as the target time period of the data acquisition.

In a possible design, the storage module 33 is specifically configured to:

store the target data in a log file, and/or send the log file to the cloud server.

The apparatus for processing the unmanned vehicle data of this embodiment can perform the technical solution in the method shown in FIG. 2. For the specific implementation process and technical principles, reference is made to the related description in the method shown in FIG. 2, and details are not described herein again.

This embodiment, by receiving data acquisition indication information sent by a cloud server; obtaining, according to the data acquisition indication information, target data from a data set; and storing the target data, and/or sending the target data to the cloud server, can thereby achieve acquisition and storage of data meets a preset condition, reduce amount of data storage of the unmanned vehicle and amount of data sent to the cloud server, save network resources, and improve data transmission efficiency.

Figure 5:
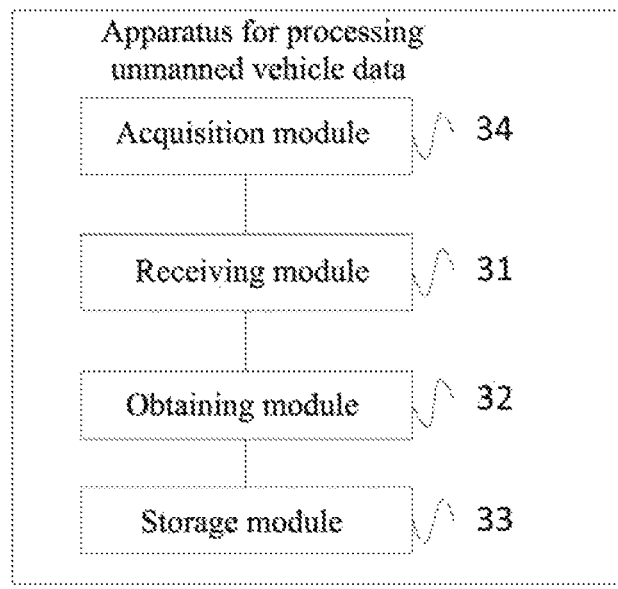
FIG. 5 is a schematic structural diagram of an apparatus for processing unmanned vehicle data according to Embodiment 4 of the present disclosure.

FIG. 5 is a schematic structural diagram of an apparatus for processing unmanned vehicle data according to Embodiment 4 of the present disclosure. As shown in FIG. 5, on the basis of the apparatus shown in FIG. 4, the apparatus for processing the unmanned vehicle data of this embodiment can further include:

an acquiring module 34, configured to store all data generated during driving of the unmanned vehicle in the data set; where an acquisition time of each piece of the data is recorded in the data set.

The apparatus for processing the vehicle data of this embodiment can perform the technical solutions in the methods shown in FIG. 2 and FIG. 3. For the specific implementation processes and technical principles, reference is made to the related descriptions in the methods shown in FIG. 2 and FIG. 3, and details are not described herein again.

This embodiment, by receiving data acquisition indication information sent by a cloud server; obtaining, according to the data acquisition indication information, target data from a data set; and storing the target data, and/or sending the target data to the cloud server, can thereby achieve acquisition and storage of data meets a preset condition, reduce amount of data storage of the unmanned vehicle and amount of data sent to the cloud server, save network resources, and improve data transmission efficiency.

In addition, this embodiment can also acquire all the data during the driving of the unmanned vehicle in real time and store them in the data set, thereby realizing an all-round monitoring of the unmanned vehicle.

Figure 6:
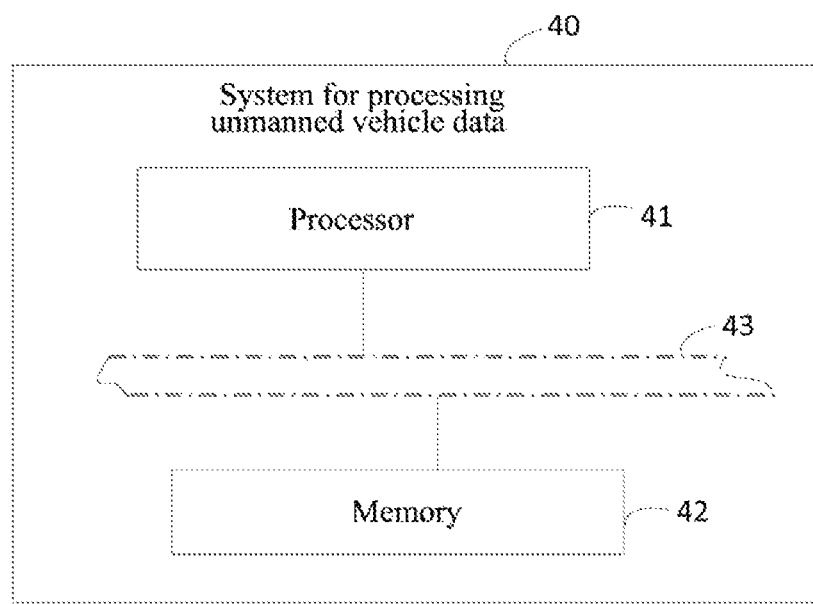
FIG. 6 is a schematic structural diagram of a system for processing unmanned vehicle data according to Embodiment 5 of the present disclosure.

FIG. 6 is a schematic structural diagram of a system for processing unmanned vehicle data according to Embodiment 5 of the present disclosure. As shown in FIG. 6, the system for processing the unmanned vehicle data 40 of this embodiment can include: a processor 41 and a memory 42.

The memory 42 is configured to store a program; the memory 42 can include a volatile memory, such as a random-access memory (RAM for short), such as a static random-access memory (SRAM for short), double data rate synchronous dynamic random access memory (DDR SDRAM for short); and the memory can also include a non-volatile memory, such as a flash memory. The memory 42 is configured to store a computer program (such as an application and a functional module implementing the above methods), a computer instruction.

The computer program, computer instruction, and the like described above can be partitioned and stored in one or more memories 42. And the computer program, computer instruction, data, and the like described above can be called by the processor 41.

The processor 41 is configured to execute the computer program stored in the memory 42 to implement the steps in the method involved in the foregoing embodiments.

For details, reference can be made to the related description in the foregoing method embodiments.

The processor 41 and the memory 42 can be separate structures or integrated an integrated structure together. When the processor 41 and the memory 42 are independent structures, the memory 42 and the processor 41 can be coupled by a bus 43.

This embodiment, by receiving data acquisition indication information sent by a cloud server; obtaining, according to the data acquisition indication information, target data from a data set; and storing the target data, and/or sending the target data to the cloud server, can thereby achieve acquisition and storage of data meets a preset condition, reduce amount of data storage of the unmanned vehicle and amount of data sent to the cloud server, save network resources, and improve data transmission efficiency.

The system for processing the unmanned vehicle data in this embodiment can perform the technical solutions in the methods shown in FIG. 2 and FIG. 3. For the specific implementation processes and technical principles, reference is made to the related descriptions in the methods shown in FIG. 2 and FIG. 3, and details are not described herein again.

In addition, an embodiment of the present disclosure further provides a computer readable storage medium, where the computer readable storage medium has computer execution instructions stored thereon, when at least one processor of a user equipment performs the computer execution instructions, the user equipment performs the foregoing various possible methods.

This embodiment, by receiving data acquisition indication information sent by a cloud server; obtaining, according to the data acquisition indication information, target data from a data set; and storing the target data, and/or sending the target data to the cloud server, can thereby achieve acquisition and storage of data meets a preset condition, reduce amount of data storage of the unmanned vehicle and amount of data sent to the cloud server, save network resources, and improve data transmission efficiency.

The computer readable medium includes a computer storage medium and a communication medium, where the communication medium includes any medium that facilitates transfer of computer program from one location to another. The storage medium can be any available medium that can be accessed by a general purpose or special purpose computer. An exemplary storage medium is coupled to a processor to enable the processor to read information from, and write information to, the storage medium. Of course, the storage medium can also be an integral part of the processor. The processor and the storage medium can be located in an ASIC. Additionally, the ASIC can be located in the user equipment. Of course, the processor and the storage medium can also exist as discrete components in a communication device.

The present disclosure also provides a program product, where the program product includes a computer program, where the computer program is stored in a readable storage medium, and at least one processor of a server can read the computer program from the readable storage medium, and the at least one processor executes the computer program to cause the server to perform the method for processing the unmanned vehicle data according to any one of the above embodiments of the present disclosure.

Those skilled in the art will appreciate that all or part of the steps to implement the various method embodiments described above may be accomplished by hardware associated with the program instructions. The foregoing program can be stored in a computer readable storage medium. The program, when executed, performs the steps including the above method embodiments; and the foregoing storage medium includes various media which can store a program code, such as a ROM, a RAM, a magnetic disk, or an optical disk.

Finally, it should be noted that the above embodiments are merely intended for illustrating the technical solutions of the present disclosure, but not for limiting thereto; although the present disclosure is illustrated in detail with reference to the foregoing embodiments, those skilled in the art should understand that they may still make modifications to the technical solutions described in the foregoing embodiments or make equivalent substitutions to part or all technical features thereof, however, these modifications or substitutions do not make the essence of the corresponding technical solutions depart from the scope of the technical solutions of the embodiments of the present disclosure.

What is claimed is:

1. A method for processing unmanned vehicle data, comprising:
    storing, by an unmanned vehicle, all data generated during driving of the unmanned vehicle in a data set; wherein an acquisition time of each piece of the data is recorded in the data set;
    receiving, by the unmanned vehicle, data acquisition indication information sent by a cloud server;
    extracting, by the unmanned vehicle, condition information from the data acquisition indication information, wherein the condition information comprises time information, location information, vehicle information, and vehicle use information, wherein the time information is information with a determined time period within a month, the vehicle information comprises information of a vehicle type and information of a vehicle identification number, and the vehicle use information is divided into a purpose of passenger and a purpose of logistics;
    determining, by the unmanned vehicle, a target time period of a data acquisition when a current state of the unmanned vehicle meets the condition information;
    taking, by the unmanned vehicle, data that is associated with the condition information and whose data acquisition time is in the target time period as target data, wherein the target data comprises user number, logistics information, user somatosensory information, brake information, environment information, distance information between an obstacle and the unmanned vehicle;

obtaining, by the unmanned vehicle, the target data from the data set; and storing, by the unmanned vehicle, the target data in a log file and sending the log file to the cloud server;

cleaning up, by the unmanned vehicle, the data in the data set in a condition that the data stored in the data set exceeds a preset threshold;

wherein the determining, by the unmanned vehicle, a target time period of a data acquisition when a current state of the unmanned vehicle meets the condition information comprises:

obtaining, by the unmanned vehicle, time information in the condition information when the current state of the unmanned vehicle meets the condition information;

selecting, by the unmanned vehicle, a time point from the time information; and taking, by the unmanned vehicle, a time period from X seconds before the time point to X seconds after the time point as the target time period of the data acquisition;

wherein the data acquisition indication information is acquiring a distance between an obstacle and the unmanned vehicle when a sudden braking occurs.

2. The method according to claim 1, wherein the, by the unmanned vehicle, receiving data acquisition indication information sent by a cloud server comprises:

receiving, by the unmanned vehicle, the data acquisition indication information sent by the cloud server by using an over the air (OTA) mode; wherein the data acquisition indication information comprises condition information and data information associated with the condition information.

3. The method according to claim 1, wherein the current state of the unmanned vehicle meeting the condition information comprises data being acquired and fed once within 6 months.

4. An unmanned vehicle, comprising: a memory, a processor, wherein the memory stores executable instructions for the processor; and the executable instructions, when executed by the processor, cause the processor to:

store all data generated during driving of the unmanned vehicle in a data set; wherein an acquisition time of each piece of the data is recorded in the data set;

receive data acquisition indication information sent by a cloud server;

extract condition information from the data acquisition indication information, wherein the condition information comprises time information, location information, vehicle information, and vehicle use information, wherein the time information is information with a determined time period within a month, the vehicle information comprises information of a vehicle type and information of a vehicle identification number, and the vehicle use information is divided into a purpose of passenger and a purpose of logistics;

determine a target time period of a data acquisition when a current state of the unmanned vehicle meets the condition information;

take data that is associated with the condition information and whose data acquisition time is in the target time period as target data, wherein the target data comprises user number, logistics information, user somatosensory information, brake information, environment information, distance information between an obstacle and the unmanned vehicle;

obtain the target data from the data set; and store the target data in a log file and send the log file to the cloud server;

clean up the data in the data set in a condition that the data stored in the data set exceeds a preset threshold;

wherein the executable instructions, when executed by the processor, further cause the processor to:

obtain time information in the condition information when the current state of the unmanned vehicle meets the condition information;

select a time point from the time information; and take a time period from X seconds before the time point to X seconds after the time point as the target time period of the data acquisition;

wherein the data acquisition indication information is acquiring a distance between an obstacle and the unmanned vehicle when a sudden braking occurs.

5. The unmanned vehicle according to claim 4, wherein the executable instructions further cause the processor to:

receive the data acquisition indication information sent by the cloud server by using an over the air (OTA) mode; wherein the data acquisition indication information comprises condition information and data information associated with the condition information.

6. A non-transitory computer readable storage medium having a computer program stored thereon, wherein the program, when executed by a processor, implements the method for processing the unmanned vehicle data according to claim 1.

* * * * *